United States Patent [19]

Nicholas

[11] Patent Number: 5,714,754

[45] Date of Patent: Feb. 3, 1998

[54] REMOTE ZONE OPERATION OF LIGHTING SYSTEMS FOR ABOVE-GROUND ENCLOSED OR SEMI-ENCLOSED PARKING STRUCTURES

[76] Inventor: John Jacob Nicholas, 127 N. Hidden Canyon, Orange, Calif. 92669

[21] Appl. No.: 838,461

[22] Filed: Apr. 7, 1997

Related U.S. Application Data

[63] Continuation of Ser. No. 567,853, Dec. 6, 1995, abandoned, which is a continuation of Ser. No. 205,794, Mar. 4, 1994, abandoned.

[51] Int. Cl.$^6$ .............................. H01J 40/14; G01J 5/00
[52] U.S. Cl. ..................... 250/221; 250/205; 250/338.1
[58] Field of Search ........................ 250/338.1, 339.14, 250/205, 214 AL, 208.4, 221, 222.1

[56] References Cited

U.S. PATENT DOCUMENTS 4,142,199  2/1979  Elwell ................................... 250/221
4,757,204  7/1988  Baldwin et al. ...................... 250/342
4,823,051  4/1989  Young ................................... 250/221

*Primary Examiner*—Edward P. Westin
*Assistant Examiner*—John R. Lee

[57] ABSTRACT

A systemic method to control fluorescent and/or incandescent lighting fixtures located in or on an above ground, enclosed or partially enclosed, parking structure uniquely employing previously patented components whereby the existing lighting fixtures of an above ground, enclosed or partially enclosed parking structure are reconfigured and rewired to accommodate a zonal, sensored lighting control system. A remote sensing unit is employed at predetermined spacing locations utilized to detect vehicular and human body movement across the sensed thresholds and to detect infrared emissions from the same sources to initiate the switching units thereby energizing the zoned lighting fixtures. Also employing included photoelectric controls of previously patented detectors to prohibit energy usage of the fixtures during the daylight hours.

2 Claims, 1 Drawing Sheet

REMOTE ZONE OPERATION OF LIGHTING SYSTEMS FOR ABOVE-GROUND ENCLOSED OR SEMI-ENCLOSED PARKING STRUCTURES

This application is a continuation of U.S. patent application Ser. No. 08/567,853, filed Dec. 6, 1995, now abandoned, which was a continuation of U.S. patent application Ser. No. 08/205,794, filed Mar. 4, 1994, now abandoned.

BACKGROUND OF THE INVENTION

The invention is related to an infrared detector control illumination system which is applicable for parking structures having at least one parking level of illuminated area supplied by incandescent or ballasted fluorescent lighting fixtures. The purpose of the invention is to control the use of the aforementioned lighting fixtures to turn them on and off when the presence of humans and/or operating vehicles is sensed by the infrared detection device. The resulting control of theses fixtures comprises a savings in energy usage dependant upon the level of activity in the structure.

Most of the current systems are "on only" systems because of the sporadic nature of use of the parking structures. This allows for an inordinate use of energy to facilitate the user no matter what time of the day the user is present.

In its present state, because of security and liability concerns, the owner of the structure has had to leave the lighting system on continuously.

SUMMARY OF THE INVENTION

The object of the current invention is to provide a zoned illumination control system comprising at least two zones, and said zone to comprise the parking spaces for at least four automobiles or vehicles within the controlled zone being lighted by the aforementioned incandescent or fluorescent lighting fixtures. The area being illuminated is a covered parking area and either open or closed on the sides with the majority or all of the fixtures being mounted overhead and at least some of the fixtures being capable of illuminating the parking level to a level of 0.25 footcandles of lumens output. The control system is to employ plural passive infrared sensors mounted overhead at predetermined space intervals in compliance with the manufacturers recommendations, which will control the energization of the lighting fixtures within the respective zones of illumination controlled by that sensor.

The sensor is to have a 360 degree detection field so as to provide a generally conical field of detection and the sensor locations are to be spaced so the zones cover substantially all of the said parking and pedestrian areas so that a vehicle or pedestrian travelling along the throughway or passageway will pass through one or more of the sensored illumination zones thus illuminating the area(s) controlled by the sensor so initiated.

After the person(s) have left the sensored area, or the vehicle movement becomes static, a predetermined timing out of the lighting system is to be initiated within the control relays of the sensor system. Any re-entry or new initialization of the sensors passive infrared sensing pattern will nullify this timing out and negate the turning off of the aforementioned fixtures.

A secondary object of the passive infrared sensor zoned system is to allow for the knowledge of the presence of person(s) within the zoned area who have not progressed to adjacent controlled areas. The adjacent areas, being so controlled by their respective sensors, will be darkened in comparison to the occupied area and will allow for this information to alert other person(s) to either avoid this occupied area or to request assistance in entering said occupied area.

A third object of the sensor system, as designed, is to eliminate the use of the aforementioned lighting fixtures during the daylight hours of operation or during any hours of operation wherein a source of light provides a predetermined level of illumination is being supplied which meets the predetermined light level set on the incorporated sensor via the contained photocell apparatus within the sensor head.

The fourth object of the invention is to lengthen the calendar time life of the lamps and components of the aforementioned fixtures by reducing their "on" time of use and therefore allows for a longer life of usage for the "on" periods of operation when they are initialized by the invention.

A BRIEF DESCRIPTION OF THE DRAWING

FIG. 1 showing the typical covered parking or vehicle storage structure with either open, partially open, or enclosed walls within which pedestrians and vehicles move.

CONTAINED ITEMS IN FIG. #1

1 Item #1 is a typical infra red sensor as described, located on or near ceiling height to detect motion and heat emissions.

2 Item #2 is the typical power supply switchpack activated by Item #1 component to initialize or deactivate the power supply to the fixtures (Item #3)

3 Item #3 is a typical incandescent or fluorescent lighting fixture which is controlled by Item #2.

4 Item #4 is showing an entry and exit doorway, stairwell, or similar passageway from which pedestrians may enter or egress the parking structure or vehicle storage area.

5 Item #5 is showing a typical elevator lobby area or similar access and egress area from which pedestrian traffic may enter or leave the parking or vehicle storage area.

6 Item #6 in the drawing is a typical passageway for the ingress and egress of vehicular traffic.

7 Item #7 is atypical one car parking stall located within the purview of the sensing device.

DESCRIPTION OF THE PREFERRED EMBODIMENT

Figure 1:
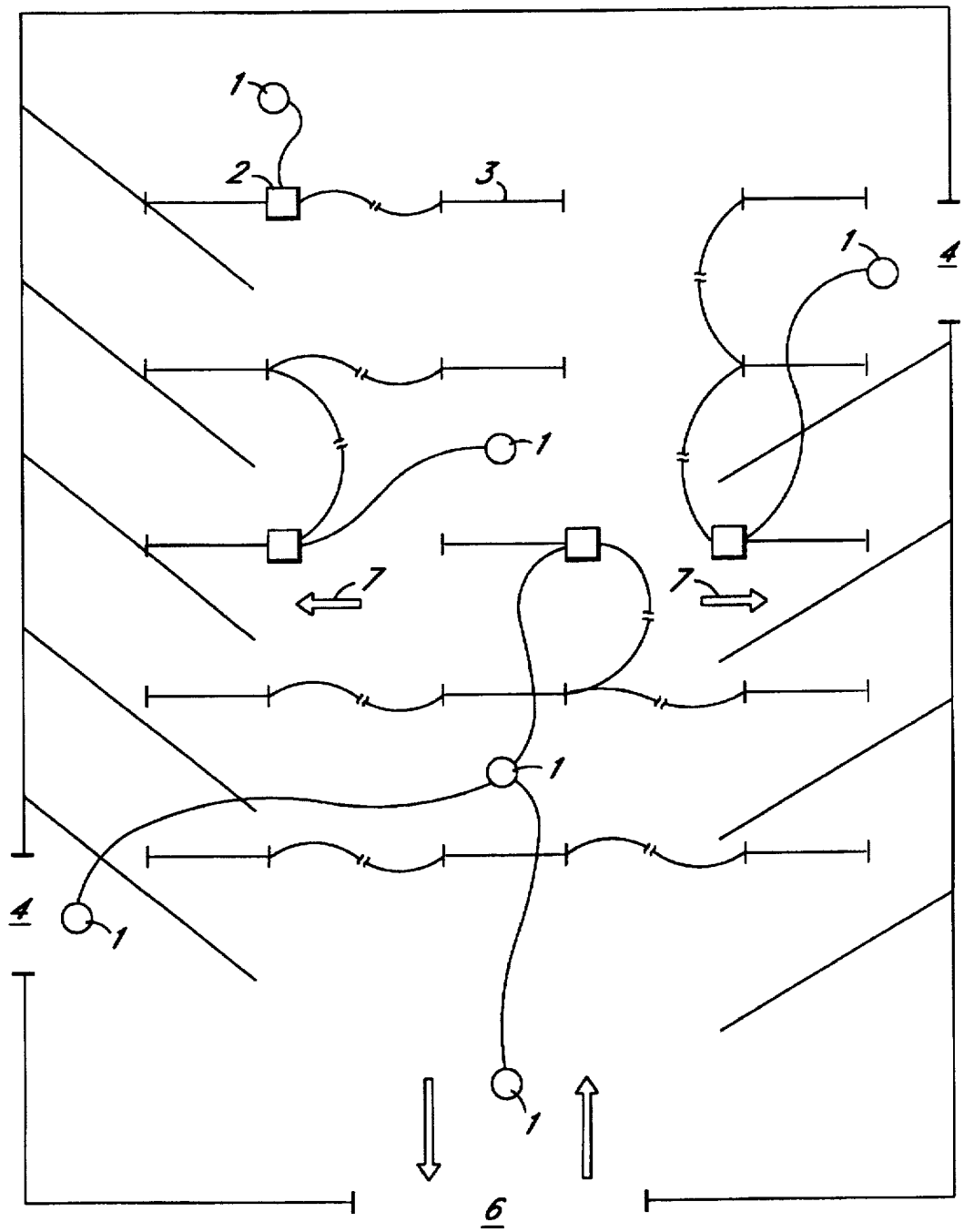

As shown in accompanying FIG. #1, the passive infrared sensors (Item #1) are installed at the ceiling level of the paring structure or vehicle storage area at a predetermined spacing and height depending upon the manufacturers recommendations and the ambient conditions of weather and natural illumination. The sensors are set to sense pedestrian traffic and vehicular traffic from the entry and exit locations,( Items #4, #5, and #6) or from the radiated heat from moving vehicles crossing the plane of the sensors in the vehicle throughways.

The motion and the radiated heat from either source initiates the response in the sensor, (Item#1) which initializes the power switch pack component of the sensor system (Item #2) which will allow for the light fixtures (Item #3) to be energized providing that the photocell of the sensor( Item

1) has not overridden the power supply due to the presence of sufficient natural or ambient light.

Upon satisfaction of the above criteria, the power supply (Item #2) will allow for the flow of energy to the zoned lighting fixtures (Item #3) dependant upon the direction of the vehicle or pedestrian(s).

Subsequent to the passage and non linear movement of the vehicle or pedestrian, or the static positioning of the vehicle, the sensor (Item #1) will initiate the timing out of the predetermined sequence within the power supply (Items #2) which will de-energize the lighting fixtures within its suzerain.

I claim:

1. A parking structure, comprising at least one parking level with a permanent covering having an area of zoned illumination comprising at least two illumination zones, each of said illumination zones containing parking spaces for at least four vehicles, said area of zoned illumination having at least one vehicle throughway located to allow for ingress and egress of said vehicles, and at least one pedestrian walkway, stairway, passageway, or elevator access to said parking level, said level being covered and either open or partially open on its sides to the ambient environment, said parking structure having an illumination system comprising:

a plurality of passive infrared sensors mounted to the ceiling of the said parking structure at plural locations in the area of zoned illumination, said illumination system comprised of plural light fixtures of the incandescent or fluorescent types with a majority of said fixtures in the area of zoned illumination being permanently mounted overhead, the fixtures illuminating said area of zoned illumination to a lighting level of at least 0.25 foot candles of lumen output at floor level;

each of said illumination zones comprising at least one sensor, at least one light fixture within said illumination zone, and at least one power supply for supplying power to said at least one fixture, each sensor having a field of detection of 360 degrees around the sensor to allow for a generally conical field of detection, said sensors located and spaced such that sensor coverage of a substantial portion of the area of zoned illumination is attained, each of said sensors capable of being activated when a vehicle or pedestrian passes within its suzerain, said activation causing electrical energy to be supplied to said at least one fixture within said illumination zone, a plurality of said ceiling mounted sensors positioned with their respective conical fields of detection distributed such that a vehicle travelling along said vehicle throughway passes through multiple fields of detection.

2. A parking structure as claimed in claim 1 wherein each of the said sensors within the illumination system contain an adjunct photoelectric cell responsive to an ambient light level from either natural or artificial sources and which will override the ability of said sensors to supply energy to said lighting fixtures, the light level being adjustable.

\* \* \* \* \*